United States Patent [19]

Beia

[11] 4,415,166

[45] Nov. 15, 1983

[54] BEARING SEAL ASSEMBLY WITH DUAL ANNULAR SUPPORT RINGS

[75] Inventor: Thomas S. Beia, Cadillac, Mich.

[73] Assignee: Cadillac Rubber & Plastics, Inc., Cadillac, Mich.

[21] Appl. No.: 462,545

[22] Filed: Jan. 31, 1983

[51] Int. Cl.³ .............................................. F16J 15/18
[52] U.S. Cl. ...................................... 277/51; 277/152; 277/166; 277/167.5; 277/192
[58] Field of Search ..................... 277/35, 44, 51, 152, 277/166, 181, 182, 187, 192, 197, 199, 167.5

[56] References Cited

U.S. PATENT DOCUMENTS

| | | | |
|---|---|---|---|
| 783,943 | 2/1905 | Frost | 277/167.5 |
| 2,838,333 | 6/1958 | Wilder et al. | 277/51 |
| 3,063,439 | 11/1962 | Kessel | 277/166 X |
| 3,291,495 | 12/1966 | Liebig | 277/152 |
| 3,910,586 | 10/1975 | Todaro | 277/51 X |
| 4,099,798 | 7/1978 | Steinmetz | 277/166 X |

FOREIGN PATENT DOCUMENTS

| | | | |
|---|---|---|---|
| 2027334 | 12/1970 | Fed. Rep. of Germany | 277/192 |
| 982259 | 2/1965 | United Kingdom | 277/166 |

Primary Examiner—Robert S. Ward, Jr.
Attorney, Agent, or Firm—Varnum, Riddering, Wierengo & Christenson

[57] ABSTRACT

A bearing seal assembly, especially adapted for use between an automotive body and a steering wheel shaft is formed from identical molded annular rings (18) and (20) which snap-fit together through slots (38) and projections (42) and an annular gasket race (22) with a frusto-conical sealing lip (24). The annular rings (18, 20) form a T-shaped cavity (46, 48) in which the annular gasket race (22) is retained.

19 Claims, 4 Drawing Figures

BEARING SEAL ASSEMBLY WITH DUAL ANNULAR SUPPORT RINGS

BACKGROUND OF THE INVENTION

1. Field of the Invention

This invention relates to bearing seals between a housing and a rotatable shaft. In one of its aspects, the invention relates to a bearing seal for use between a steering column and the body of an automobile.

2. State of the Prior Art

A seal structure between a steering shaft and an automobile body should seal the inside from the outside and permit rotation of the steering column about its longitudinal axis. Further, the bending stresses on the steering column should be minimized. The bending stresses on the steering column can result from manufacturing tolerances or slight errors in lining up the two support bearings for the shaft in the automobile body. Thus, ideally, the bearings will have some flexibility for alignment purposes and provide a seal, preferably thermal as well as dirt, air, moisture and noise, and permit relatively frictionless rotation of the steering shaft with respect to the automotive body.

The U.S. patent to Shiomi et al 4,185,880, issued Jan. 29, 1980, discloses a steering column bearing wherein a ball bearing assembly is provided to permit rotation of the steering column with respect to the body and the ball bearing assembly itself is mounted in a spherical, concave surface to allow pivotable movement of the axis of the shaft about three axes of freedom.

This bearing assembly does not appear to provide a good thermal, dirt, noise, air and moisture seal without additional packing or boots and is more costly.

Bearing shaft seals including flexible sealing members for many other purposes have been devised. For example, Reich in U.S. Pat. No. 2,476,324, issued July 19, 1949, teaches a sealing assembly in which a pair of rubber rings having frusto-conical shaped sealing lips are held in a metal collar and a metallic plate. One of the sealing lips seals against the shaft but the shaft rotates or slides with respect to the sealing lip.

Shaft sealing bearings of relatively rigid nature are shown by the following U.S. Pat. Nos.:
Roschlau 2,704,230 (issued Mar. 15, 1955)
Gunnell 3,086,826 (issued Apr. 23, 1963)
Kume 4,133,587 (issued Jan. 9, 1979)
Bosco 4,204,718 (issued May 27, 1980)

SUMMARY OF THE INVENTION

According to the invention, a relatively inexpensive hearing shaft seal, especially for use between an automotive steering shaft and a body, has a relatively frictionless bearing, yet seals against dirt, air, moisture, noise and temperature and maintains some degree of flexibility to permit rotation of the axis of the shaft about multiple degrees of freedom. The seal is tight against the shaft around the entire circumference thereof regardless of variations in diameter of the shaft. The bearing shaft assembly comprises first and second annular rings of substantially identical construction, each having a cavity formed in the inner face at the inner circumferential surface thereof and a means formed in one of the faces to snap-fit together two of the substantially identical annular rings with identical faces thereof in juxtaposed facing relationship. An annular gasket member has an inwardly-extending radial flange of relatively flexible nature to seal against a shaft. Another portion of the gasket is shaped to fit snugly within the cavities formed in the first and second rings which are joined together at the inner faces thereof.

The interengaging means between the two rings preferably include projections extending from the face and slots in the face, the slots being adapted and shaped to receive and retain the projections from an ajacent ring. The slots include a ledge at the face and the projections have a shoulder which is received in interfering relationship with the ledge. The projection has a tapered leading surface to cam against the projection in the slots over the ledges. Desirably, the rings are molded from a resilient plastic material and the sealing gasket is molded from a softer plastic material. The plastic materials have a low coefficient of friction so that the annular gasket member freely rotates within the annular rings.

The inwardly-extending flange of the annular gasket member is preferably frusto-conically shaped to ease the assembly of the bearing seal to the shaft and to facilitate substantially complete conformity of the inwardly-extending flange to the shaft regardless of manufacturing tolerances or aberations of the shaft.

In one embodiment, an annular undercut is provided between the inwardly-extending flange of the gasket member at the side at which the inwardly-extending flange makes an acute angle to the inner surface of an annular portion of the gasket member to facilitate flexing of the inwardly-extending flange with respect to the annular portion. Further, the annular end portion of the inwardly-extending flange has a radial lip perpendicular to the axis of the annular rings.

Further according to the invention, the bearing seal assembly comprises first and second molded rings which have means to snap-fit the two rings together at facing surfaces. A cavity is formed between the two rings and an annular gasket member having an inwardly-extending radial flange is positioned in the cavity between the two rings. The inwardly-extending flange is frusto-conically shaped for ease in assembly of the bearing seal assembly to the shaft and to facilitate conformity of the inwardly-extending flange to the shaft.

BRIEF DESCRIPTION OF THE DRAWINGS

The invention will now be described with reference to the accompanying drawings in which.

DESCRIPTION OF THE PREFERRED EMBODIMENTS

Figure 1:
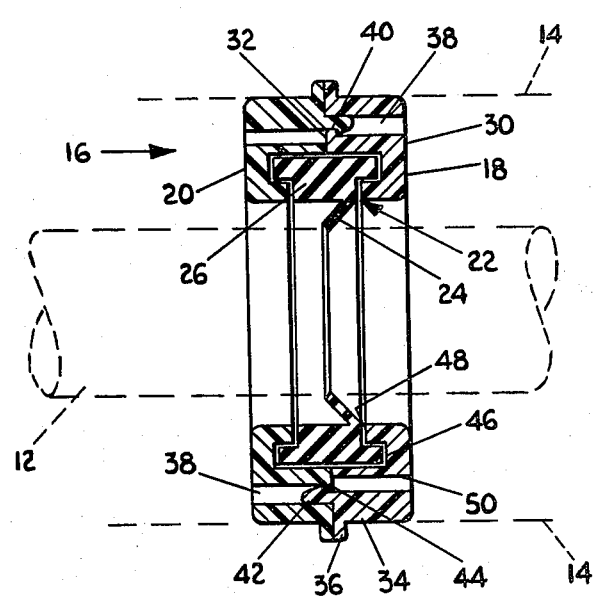
FIG. 1 is a sectional view of the bearing seal assembly according to the invention.
Figure 2:
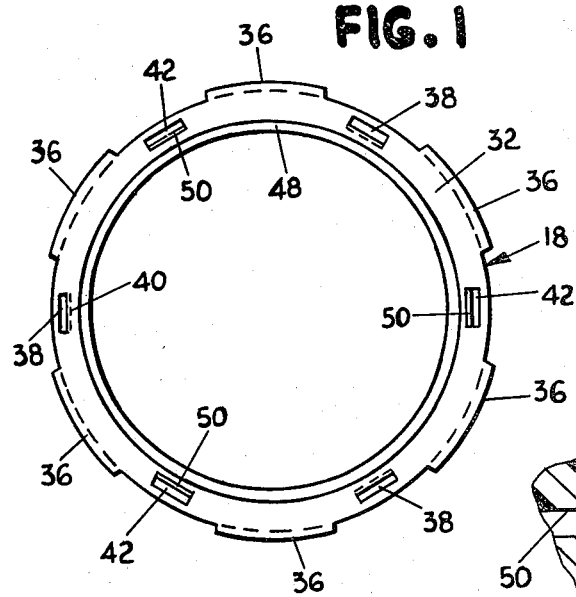
FIG. 2 is a plan view of an annular ring used in the bearing seal assembly.
Figure 3:
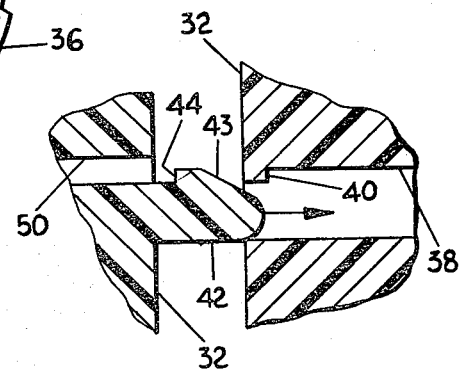
FIG. 3 is an enlarged fragmented view of a portion of the seal assembly illustrated in FIG. 1, showing the method of joining the two rings together.

Referring now to the drawings, and to FIGS. 1-3 in particular, there is shown in phantom lines a shaft 12 and a housing 14 which may be in the form of a rubber boot. The shaft 12 may be a steering column for an automobile and the housing or rubber boot 14 may be that portion of the automobile through which the steering shaft extends. A bearing seal assembly 16 is provided between the housing 14 and the shaft 12 to permit rotation of the shaft 12 with respect to the housing and also to seal one side of the housing with respect to the other. In the case of an automotive installation, the bearing seal assembly seals the outside of the car from the inside.

The bearing seal assembly 16 comprises two identical annular rings 18 and 20 with an annular gasket race 22 therebetween. The gasket race 22 is formed from a T-shaped annular ring 26 and an integrally formed frusto-conical sealing lip 24 which has an annular end portion which seals against the shaft 12.

Each of the annular rings 18 and 20 is identical and, for purposes of the description, only one such ring will be described. Each ring comprises an outer face 30, an inner face 32 and a circumferential surface 34. Six positioning tabs 36 are spaced equally around the circumference of the ring at the inner face thereof. Three slots 38 are formed between the outer face 30 and the inner face 32 and are spaced equally about the central axis of the ring. Each slot 38 has a ledge 40 which extends radially into the slot at the inner face 32. Three projections 42 extend from the inner face 32 and have a camming surface 43 which terminates in a return shoulder 44. A slot 50 is formed between the inner face 32 and the outer face 30 adjacent to the projection 42. Each projection 42 is equally spaced between two slots 38 and the three projections 42 are thus equally radially spaced about the inner face 32.

An annular cavity 46 and an annular slot 48 are provided in the inner face 32 at the central portion thereof to form a cavity for the T-shaped annular ring 26 of the gasket race 22.

Both of the annular rings 18 and 20 are made from identical material and are in all respects identical. Preferably, the annular rings 18 and 20 are made by injection molding with a suitable hard, self-lubricating, resilient plastic such as nylon. The annular gasket race 22 is also made from a plastic material, such as Hytrel 5526, which is a polyester elastomer plastic of 55 durometer manufactured by DuPont. Since the parts are plastic, and the coefficient of friction between the parts is very small, lubrication between the annular rings 18 and 20 and the annular gasket race 22 is not necessary. However, the annular gasket race 22 will rotate very easily with respect to the annular rings 18 and 20. The gasket race is consideraby softer than the annular rings 18 and 20, for example, 55 durometer. The thinness of the sealing lip 24 makes it very flexible and pliable so that the sealing lip 24 closely conforms with the shaft regardless of manufacturing tolerances or aberations, and is easily forced onto the shaft.

The bearing seal assembly is quickly, easily and securely assembled by placing the inner faces 32 of the annular rings 18 and 20 together, with one ring rotated 60° with respect to the other ring and with the annular gasket race 22 therebetween. In this orientation, the projections 42 will line up with the slots 38. Forcing the two rings together will cause the projections 42 to fit within the slots 38, with the camming surfaces 43 riding over the ledges 40 until the shoulder 44 is securely seated behind the ledge 40. In this manner, the annular rings 18 and 20 are snap-fit together quickly, easily and securely. When secured in this manner, the positioning tabs 36 of each of the annular rings 18 and 20 are aligned with each other. These positioning tabs can then be used for securely positioning the bearing seal assembly into a housing or rubber boot 14 which may have indentations or a slot to receive the positioning tabs 36.

Figure 4:
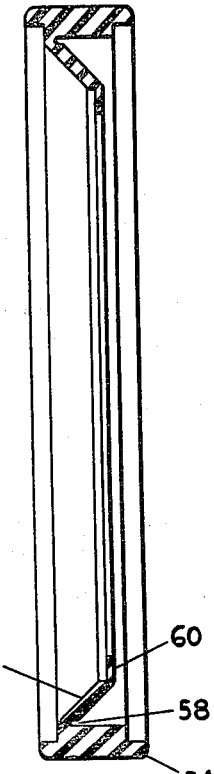
FIG. 4 is a sectional view of a modified annular gasket race according to the invention.

In FIG. 4, the annular gasket race is formed from a T-shaped annular ring 54, a frusto-conical sealing lip 56 and an annular radially directed flange 60. The sealing lip 56 and the flange 60 are relatively flexible and pliable to that the flange 60 conforms to the shape of the shaft and forms a good seal therewith. A slight undercut radius 58 is provided between the frusto-conical sealing lip 56 and the T-shaped annular ring 54 to increase the flexibility of the lip 56. The annular gasket race shown in FIG. 4 is used in a bearing seal assembly structure identical with FIG. 1 except that the gasket race shown in FIG. 4 would be substituted for the annular gasket rade 22 shown in FIG. 1.

Thus, the invention provides a bearing seal assembly which seals against dirt, air, moisture, noise and temperature and further which is inexpensive to manufacture and assemble. The rings are identical and can be injection molded. The gasket member can also be injection molded. Thus, there is a minimum of parts which are quite easy to assemble. The bearing seal assembly, while inexpensive to manufacture, is durable and quite functional.

Whereas the invention has been described with respect to the use of the bearing seal assembly between an automotive steering shaft and a body of an automobile, the assembly can be used for other purposes either within an automobile or outside the automotive field.

Reasonable variation and modification are possible within the scope of the foregoing disclosure and drawings without departing from the spirit of the invention which is defined in the appended claims.

The embodiments of the invention in which an exclusive property or privilege is claimed are defined as follows:

1. A bearing seal assembly comprising:
   first and second annular rings of substantially identical construction, each having:
   an outer face;
   an inner face;
   an outer circumferential surface; an inner circumferential surface; a cavity formed in the inner face of the inner circumferential surface; and
   means formed in the inner face to snap-fit together two of said substantially identical annular rings with said inner faces thereof in juxtaposed facing relationship;
   an annular gasket member having an annular portion and an inwardly-extending flange of relatively flexible nature to seal against a shaft, the annular portion of said gasket member being shaped to fit snugly within the cavities formed in the first and second rings which are joined together at inner faces thereof; and
   said first and second annular rings being joined together at the inner faces thereof with said annular gasket member therebetween.

2. A bearing seal assembly according to claim 1 wherein said interengaging means include projections extending from said inner face and slots in said inner face, said slots adapted and shaped to receive and retain said projections.

3. A bearing seal assembly according to claim 2 wherein said slots include a ledge at said inner face and said projections have a shoulder which is received in interferring relationship with said ledge.

4. A bearing seal assembly according to claim 3 wherein said projections include a tapered leading surface to cam the projection into the slots and over the ledges.

5. A bearing seal assembly according to claim 4 wherein said projections and slots are equally annularly spaced about the inner faces of said annular ring.

6. A bearing seal assembly according to claim 4 wherein said first and second rings are molded of a resilient plastic material.

7. A bearing seal assembly according to claim 6 and further comprising slots formed in said first and second rings in registry with the shoulders on said projections.

8. A bearing seal assembly according to claim 4 and further comprising slots formed in said first and second rings in registry with shoulders on said projections.

9. A bearing seal assembly according to claim 6 wherein said first and second rings and said annular gasket member are formed from low-friction plastic material so that said annular gasket member rotates relatively frictionless within said first and second annular rings.

10. A bearing seal assembly according to claim 9 wherein said inwardly-extending flange is frusto-conically shaped to ease the assembly of the bearing seal assembly to a shaft and to facilitate conformity of the end of the inwardly-extending flange to the shaft.

11. A bearing seal assembly according to claim 10 and further comprising an annular undercut between the inwardly-extending flange and the annular portion at the side at which the inwardly-extending flange makes an acute angle with the inner surface of the annular portion to facilitate flexing of the inwardly-extending flange with respect to the annular portion.

12. A bearing seal assembly according to claim 11 wherein said inwardly-extending flange has an annular end portion extending inwardly perpendicular to the axis of the annular rings.

13. A bearing seal assembly according to claim 10 wherein said inwardly-extending flange has an annular end portion extending inwardly perpendicular to the axis of the annular rings.

14. A bearing seal assembly according to claim 1 wherein said inwardly-extending flange is frusto-conically shaped to ease the assembly of the bearing seal assembly to a shaft and to facilitate conformity of the end of the inwardly-extending flange to the shaft.

15. A bearing seal assembly according to claim 14 and further comprising an annular undercut between the inwardly-extending flange and the annular portion at the side at which the inwardly-extending flange makes an acute angle to the inner surface of the annular portion to facilitate flexing of the inwardly-extending flange with respect to the annular portion.

16. A bearing seal assembly according to claim 15 wherein said inwardly-extending flange has an annular end portion extending inwardly perpendicular to the axis of the annular rings.

17. A bearing seal assembly according to claim 1 wherein said first and second rings and said annular gasket member are formed from a low-friction plastic material so that said annular gasket member rotates relatively frictionless within said first and second annular rings.

18. A bearing seal assembly comprising first and second rings which are snap-fit together at adjoining faces thereof, said first and second annular rings forming a cavity therebetween at a radial inward portion thereof;
an annular gasket member having an annular portion fitting snugly within the cavity formed between the first and second annular rings and having a radially inwardly directed frusto-conical flange formed of a relatively flexible material to form a sealing lip with a shaft extending through the annular rings.

19. A bearing seal assembly according to claim 18 wherein the first and second rings and the annular gasket member are formed from a low-friction plastic material so that said annular gasket member rotates relatively frictionless within said first and second annular rings.

* * * * *